United States Patent [19]
Dörig

[11] 4,183,635
[45] Jan. 15, 1980

[54] MOTION-PICTURE CAMERA WITH LONG-TERM EXPOSURE

[75] Inventor: Franz Dörig, Great Neck, N.Y.

[73] Assignee: Bolex International SA, Ste. Croix, Switzerland

[21] Appl. No.: 896,585

[22] Filed: Apr. 14, 1978

[30] Foreign Application Priority Data

Apr. 15, 1977 [CH] Switzerland ............. 4694/77

[51] Int. Cl.² ................................. G03B 7/08
[52] U.S. Cl. ........................ 352/141; 352/84; 352/137; 352/169; 352/175
[58] Field of Search ............ 352/84, 121, 137, 166, 352/169, 141, 174, 175, 180

[56] References Cited

U.S. PATENT DOCUMENTS

| | | | |
|---|---|---|---|
| 3,705,764 | 12/1971 | Reinsch | 352/169 |
| 3,753,613 | 8/1973 | Reinsch et al. | 352/137 |
| 3,762,806 | 10/1973 | Roth et al. | 352/169 |
| 3,898,000 | 8/1975 | Kobayashi et al. | 352/141 |
| 4,003,646 | 1/1977 | Freudenschuss et al. | 352/169 |
| 4,052,126 | 10/1977 | Freudenschuss et al. | 352/141 |

Primary Examiner—Russell E. Adams
Attorney, Agent, or Firm—Montague & Ross

[57] ABSTRACT

A motor driving the shutter of a motion-picture camera is intermittently energizable under the control of two time-constant networks triggering respective pulse generators of the one-shot type, the first time-constant network including a photoresistor to measure an exposure interval dependent upon luminous intensity, the second time-constant network being adjustable to establish a selected recurrence period. With the shutter arrested in an unblocking position at the start of an operating cycle, which coincides with the beginning of an exposure interval, a pulse from the first generator releases the shutter for movement into a blocking position until a pulse from the second generator restarts the cycle by letting the shutter return to its unblocking position. If, however, illumination is so low that the exposure interval outlasts the preset recurrence period, the shutter remains open until the first pulse generator signals the end of the exposure interval whereupon the cycle is immediately restarted; this latter condition, involving the lengthening of a cycle, can be indicated to the user by a light signal.

10 Claims, 5 Drawing Figures

MOTION-PICTURE CAMERA WITH LONG-TERM EXPOSURE

FIELD OF THE INVENTION

My present invention relates to a motion-picture camera of the type having a (preferably rotatable) shutter whose normal operating cycle, serving to block the illumination of a film during frame changes occurring within a small fraction of a second, may be selectively lengthened to allow for more extended exposures and/or for time-lapse picture taking.

BACKGROUND OF THE INVENTION

Time-lapse cinematography, resulting in an acceleration of motion upon reproduction, is used for trick films and also for the study of slowly progressing phenomena such as, for example, the growth of a plant. Moreover, poor illumination sometimes makes it necessary to prolong the exposure time of individual film frames in situations in which the resulting apparent acceleration can be tolerated, as during the filming of scenery with little or no motion. The latter situation also exists where a film camera is used for the production of slides or other still pictures to be copied from the individual frames.

In operating a camera with such an extended shutter cycle, it is necessary to select two separate but interrelated parameters, namely the recurrence period of shutter closure and the exposure interval which generally should be less than that recurrence period. Since the exposure interval depends upon the luminous intensity of the object or scene to be photographed, this interval should be automatically adjustable with the aid of a photometric device which may modify the setting of an electronic pulse counter steppable by a square-wave oscillator. Conventional systems utilizing such pulse generators may be built into the camera or connected to it as a separate attachment.

OBJECTS OF THE INVENTION

The general object of my present invention is to provide an improved motion-picture camera of the type discussed, switchable between normal-cycle and extended-cycle operation, in which the two aforementioned parameters are established by simple and reliable circuitry.

A more particular object is to provide means in such a camera for allowing exposure times longer than a selected recurrence period under conditions of particularly pooor illumination.

A related object is to provide means for enabling the user to select an optimum cycle length consistent with the available illumination.

SUMMARY OF THE INVENTION

A motion-picture camera according to my invention, designed to realize the aforestated objects, comprises first timing means including a photosensitive element (preferably a photoresistor) for measuring an exposure interval of a duration varying inversely with the luminous intensity, second timing means including an adjustable impedance element for measuring a preselected recurrence period, and a control circuit for the intermittent energization of the shutter drive in response to signals from the two timing means, that circuit serving to (a) place the shutter in its unblocking position at the start of an operating cycle, which coincides with the beginning of an exposure interval, and (b) return the shutter to its blocking position at the end of that exposure interval preparatorily to the start of a new operating cycle at the end of a recurrence period.

According to a more particular feature of my invention, each of the two timing means comprises a one-shot pulse generator triggerable by a respective time-constant network, the first of these networks including a photoresistive element whereas the other network includes the adjustable impedance element which preferably is also designed as a resistor. A first branch of the control circuit is connected to the output of the first pulse generator to initiate, upon the occurrence of a pulse from that generator, a movement of the shutter from its unblocking position to its blocking position. A second branch of the control circuit is connected to the output of the second pulse generator for initiating, in response to a pulse therefrom, a return of the shutter to its unblocking position. This second branch, advantageously, includes storage means also connected to the output of the first pulse generator to make the start of a new cycle dependent upon the arrival of pulses, successively or simultaneously, from both generators.

The last-mentioned feature has the result that, whenever the exposure interval outlests the preselected recurrence period, the restarting of a new operating cycle will be delayed to the end of the exposure interval as determined by the associated photosensitive element. This insures that each film frame will be properly exposed even if the preselected recurrence period is incompatible with the actual lighting conditions.

In order to minimize the occurrence of such irregularly extended operating cycles, I further prefer to provide the camera with switch means for connecting the photosensitive element and the adjustable impedance element—designed as resistors—in a bridge circuit with a pair of reference resistances, the state of balance of the bridge being indicated by signaling means connected thereacross to advise the user whether the selected recurrence period is longer or shorter than the requisite exposure interval. It should be noted that, under some circumstances, this exposure interval will have to be determined with a diaphragm setting at less than maximum aperture, e.g. to maintain a desired depth of field.

BRIEF DESCRIPTION OF THE DRAWING

The above and other features of my invention will now be described in detal with reference to the accompanying drawing in which.

SPECIFIC DESCRIPTION

Figure 1:
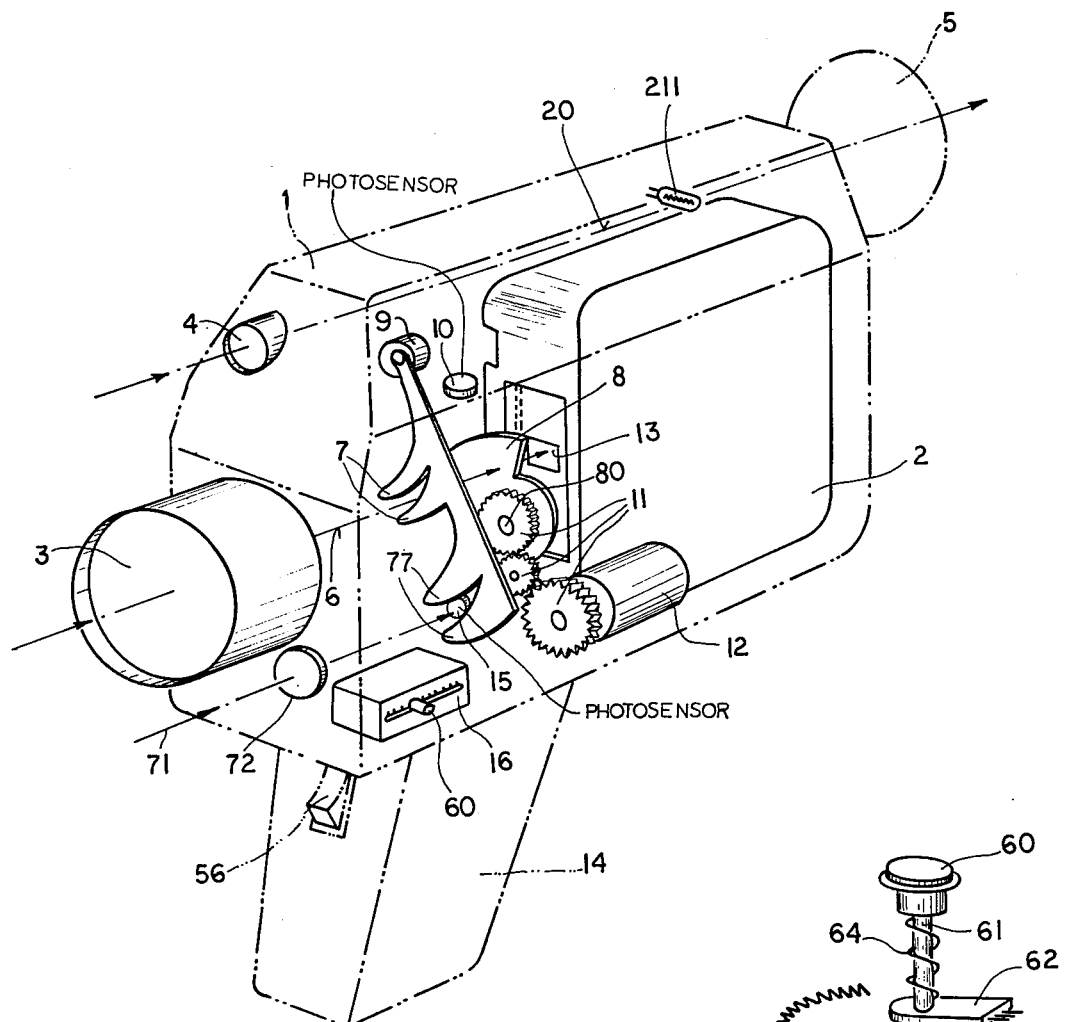
FIG. 1 is a somewhat diagrammatic perspective view of a motion-picture camera embodying the present invention.

In FIG. 1 I have shown a motion-picture camera 1 whose housing has been indicated only in phantom lines to make visible its internal parts as far as they are relevant to the present invention. The housing contains a conventional film cassette 2 with an image gate 13 which can be periodically obstructed by a rotary shutter 8 carried on a shaft 80. The image gate 13 is in line with the optical axis 6 of an objective 3 paralleling the light path 20 between a viewfinder lens 4 and an associated eyecup 5. A photometric device 10, illuminated by light branched off the axis 6 with the aid of a nonillustrated semireflecting mirror, controls a galvanometer 9 which drives a diaphragm 7 of the converging-slit type interposable between objective 3 and image gate 13. A similar diaphragm 77, integral with diaphragm 7, is concurrently interposable in the path of light rays 71 focused by a lens 72 upon another photosensitive element 15, specifically a photoresistor.

Shutter 8 is driven by an electric motor 12 via a gear train 11, the motor being energizable by a power pack including one or more batteries 26 (FIG. 2) advantageously lodged in a handle 14 of the camera housing. The same power pack also supplies current to the photosensors 10 and 15 as well as to the other circuit elements of the system. Most of these circuit elements, including those serving for the control of galvanometer 9 by photosensor 10, are contained in a box 16 which is provided with a selector 60 for the presetting of a desired recurrence period, longer than a normal operating cycle corresponding to a revolution of the continuously rotating shutter 8, as more fully described hereinafter. A switch 56 on handle 14 serves for the initiation of a series of picture-taking operations in the extended-cycle mode. Also shown in FIG. 1 is a signal lamp 211 which lies in the light path 20 of the viewfinder 4 and is designed to indicate to the user a deviation from the preset cycle length as will presently be described.

Figure 2:
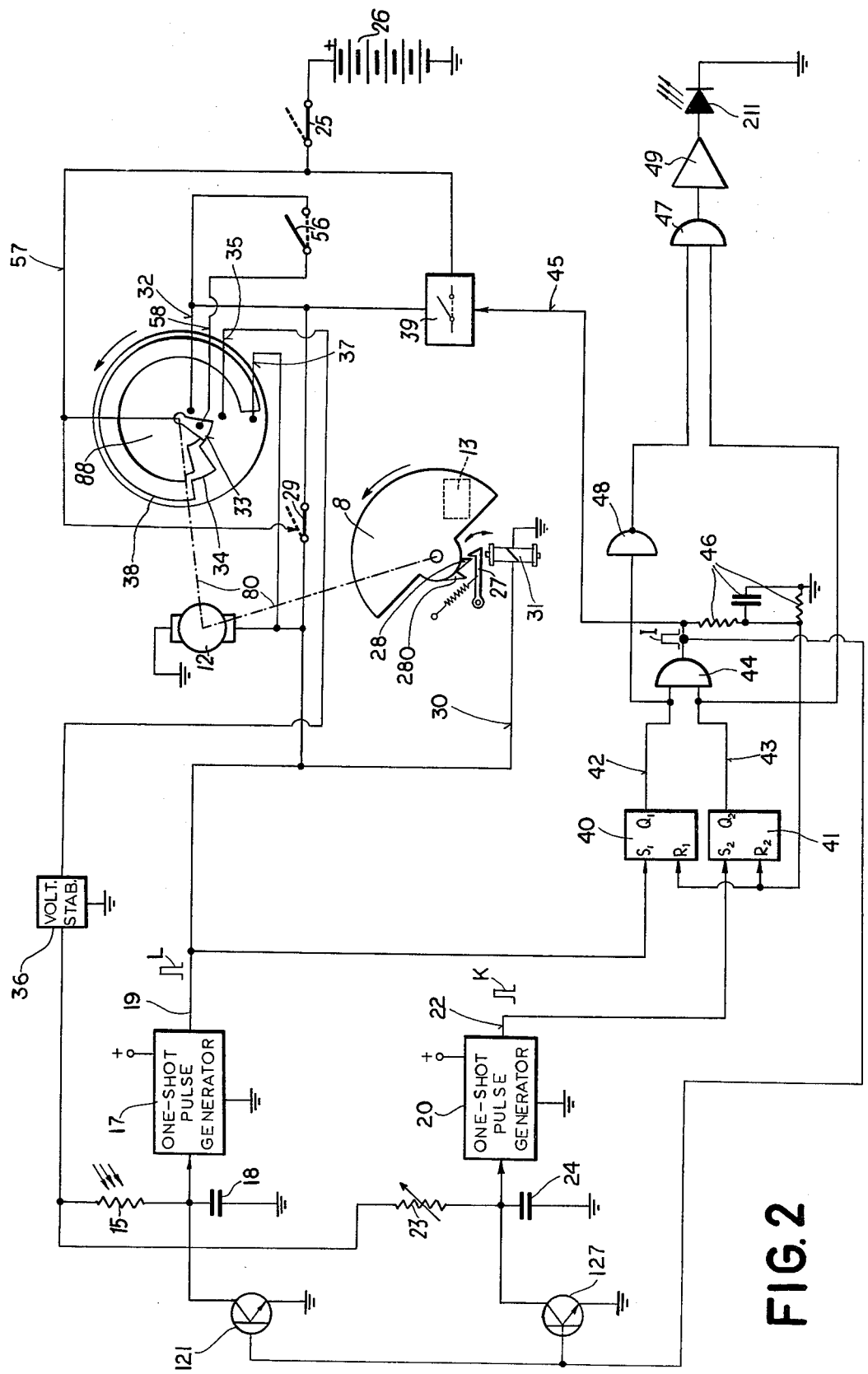
FIG. 2 is a diagram of a control circuit for the operation of a rotary shutter included in the camera of FIG. 1.

In FIG. 2, in which the shutter shaft 80 has been schematically represented by a broken phantom line, that shaft is shown to support a disk 88 of insulating material serving as a carrier for several interconnected conductor tracks 33, 34, 38 energized via a lead 57 by battery 26 upon the closure of a master switch 25. Disk 88, which has not been drawn to scale relative to shutter 8, need not be physically spaced from that shutter but could be an integral central part thereof, with the tracks 33, 34, 38 preferably disposed on its rear surface. These tracks coact with respective contactors or brushes 32, 35 and 37, a further brush 58 being in contact with track 33 in an illustrated home position in which the shutter 8 obstructs the image gate 13 and which may therefore also be referred to as a blocking position. In this blocking position the shutter 8 is arrested by an electromagnetic detent comprising a spring-loaded pawl 27 constituting the armature of an electromagnet 31, a tooth 28 on the shutter body being engaged by pawl 27 at that point. Another tooth 280, peripherally offset from tooth 28 by an arc of roughly 45°, defines with pawl 27 an unblocking position in which the image gate 13 is traversed by incident light. The operating coil of magnet 31 is connected, in parallel with the stator of motor 12, to a lead 30 which, in the illustrated position of a manual switch 29, is tied to the brush 32. Closure of the switch 56 extends the connection 30, 32 to the brush 58 and thereby, in the illustrated home position, to supply lead 57. In the alternate position of switch 29, indicated in dotted lines, lead 30 is connected to lead 57 for continuous energization of motor 12 and magnet 31, pawl 27 being thus held out of the path of teeth 28 and 280; shutter 8 then operates in the usual manner to prevent the illumination of a film behind image gate 13 while that film is advanced by one frame with the aid of a traction claw synchronized with the shutter motion.

Lead 30 is connected to the output 19 of a one-shot pulse generator 17, such as a Schmitt trigger, controlled by a time-constant network which comprises the photoresistor 15 in series with a capacitor 18. Another such time-constant network, comprising a capacitor 24 in series with a variable resistor 23 which is manually adjustable by the selector 60 of FIG. 1, is connected in parallel with network 15, 18 and serves to trigger a second one-shot pulse generator 20. The two time-constant networks are energizable from contact brush 35, in an off-normal position of disk 88 offset by roughly 60° from its home position, through the intermediary of a voltage stabilizer 36 which may include an electronic breakdown device such as a Zener diode. When the charging voltage of capacitor 18 reaches the threshold of generator 17, the latter emits at its output 19 a short pulse L; a similar pulse K appears at an output 22 of generator 20 whenever capacitor 24 is charged to the threshold voltage of the latter generator. Capacitors 18 and 24 are dischargeable upon the conduction of respective transistors 121 and 127 which are normally cut off.

Figure 3:
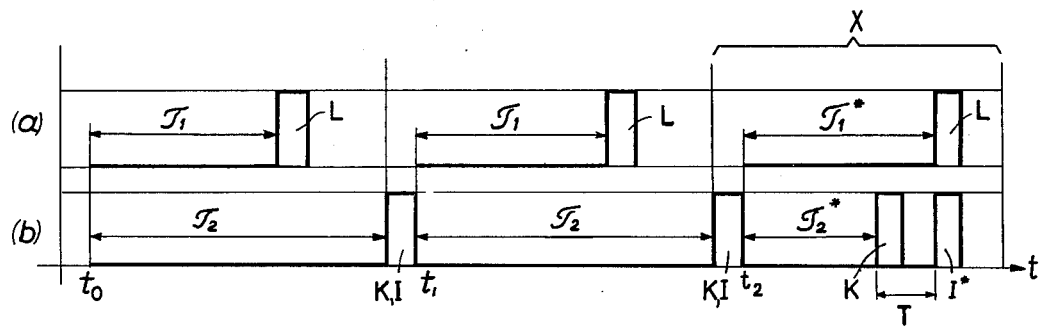
FIG. 3 is a timing diagram relating to the operation of the circuit of FIG. 2.

Pulse L, occurring at the end of an exposure interval $\tau_1$ (FIG. 3), is fed not only to the lead 30, which constitutes a first branch of the control circuit shown in FIG. 2, but also to the setting input $S_1$ of a flip-flop 40 forming part of a storage unit included in a second branch of that control circuit. Another flip-flop 41 of this storage unit has its setting input $S_2$ connected to output 22 of generator 20 to receive the pulse K therefrom at the end of a recurrence period $\tau_2$ (FIG. 3). The set outputs $Q_1$ and $Q_2$ of flip-flops 40 and 41 are connected by respective leads 42 and 43 to the inputs of an AND gate 44 which emits a restarting pulse I whenever both these inputs are simultaneously energized, i.e. when flip-flops 40 and 41 are set. Pulse I is transmitted to a control input 45 of an electronic switch 39 which, in the presence of that pulse, connects the lead 57 to the energizing lead 30 of motor 12 and magnet 31 in the illustrated position of switch 29. Another time-constant network 46 feeds back the leading edge of pulse I, after a short delay determining the width of that pulse, to the resetting inputs $R_1$ and $R_2$ of flip-flops 40 and 41. Pulse I is also applied to the bases of transistors 121 and 127 for a quick discharge of their associated capacitors 18 and 24.

Leads 42 and 43 are further connected to respective inputs of an AND gate 47, with interposition of an inverter 48 between that gate and lead 42. Gate 47, which conducts when flip-flop 41 is set while flip-flop 40 is still reset, drives an amplifier 49 to energize the signal lamp 211 here shown as a light-emitting diode.

The system so far described operates as follows:

With switches 25 and 29 in their illustrated position, the shutter 8 is at rest since its tooth 28 is engaged by the pawl 27. A brief closure of switch 56 by the user energizes both the motor 12 and the magnet 31 whereupon shutter 8 and disk 88 rotate counterclockwise, with brush 32 contacting the associated track 33 even as the brush 58 leaves that track. Lead 30 thus remains energized until, after about an eighth of a revolution, brush 32 steps off the track 33 to de-energize the motor and release the pawl 27 which now engages the tooth 280 to stop the shutter in its unblocking position.

In FIG. 3 the instant of closure of switch 56, indicated at $t_o$, marks the start of an exposure interval $\tau_1$ and a recurrence period $\tau_2$. The time required for moving the shutter to its unblocking position is only a small fraction of a second and is therefore negligible compared with the periods $\tau_1$ and $\tau_2$ whose duration might be as long as half a minute, for example.

In the unblocking position defined by tooth 280, brush 35 has just made contact with track 34 to supply the stabilizer 36 which now delivers a constant charging voltage to capacitors 18 and 24 by way of photoresistor 15 and manually adjustable resistor 23, respectively. Depending on the intensity of the light rays reaching the photoresistor, capacitor 18 charges at a slower or faster rate to a point where generator 17 is triggered, thereby emitting the pulse L which virtually terminates the exposure interval $\tau_1$ by briefly reoperating the motor 12 and the magnet 31. With tooth 280 now escaping from pawl 27, shutter 8 is rapidly driven into its home position in which it is rearrested by the engagement of tooth 28 with pawl 27. The energization of motor 12 and magnet 31 is maintained during this homing operation, over approximately three-quarters of a turn, by contact between brush 37 and track 38.

The occurrence of pulse L at the end of interval $\tau_1$ sets the flip-flop 40. Some time thereafter, at an instant determined by the setting of resistor 23, capacitor 24 charges to the threshold level of generator 20 which now emits the pulse K indicating the end of the selected recurrence period $\tau_2$. Pulse K sets the flip-flop 41 whereby AND gate 44 conducts and generates a restarting pulse I substantially coincident therewith which closes the electronic switch 39 for a time sufficient for an advance of disk 88 to close the circuit between brush 32 and track 33. Transistors 121 and 127 conduct in the presence of pulse I to discharge the capacitors 18 and 24. At the instant of termination of pulse I, designated $t_1$ in FIG. 3, the parts are in the same position as at the time $t_o$ so that a new operating cycle commences; the recurrence period $\tau_2$ remains the same but the exposure interval $\tau_2$ may be different if the illumination has changed in the interim. In fact, illumination may be so poor that shutter 8 must be held in its unblocking position beyond the time allowed by the setting of resistor 23 for the completion of the cycle. Such a situation has been indicated at X in FIG. 3 where an exposure interval $\tau_1^*$, beginning at a time $t_2$, outlasts a preset recurrence period $\tau_2^*$ beginning at the same instant. The pulse K emitted by generator 20, therefore, occurs before the pulse L produced by generator 17; during a time T elapsing between these two pulses, motor 12 is not re-energized since AND gate 44 remains nonconducting in the absence of an energization of lead 42. When flip-flop 40 is set by a pulse L at the end of interval $\tau_1^*$, the restarting pulse I* appears concurrently therewith in the output of that AND gate to close the electronic switch 39 and to begin a new cycle.

During the time T the AND gate 47 conducts and energizes the LED 211 which according to FIG. 1 is viewed through eyecup 5. Thus, the user learns that illumination is insufficient for operation at the selected cycle frequency. If conditions permit, the user may then readjust the resistor 23 by means of selector 60 to lengthen the recurrence period, or possibly remove a stop which theretofore had arrested the diaphragm 7 at less than full aperture; if neither of these possibilities exists, the attempt to take pictures may have to be abandoned. The sequence of operations initiated by the closure of starting switch 56 can be terminated by the opening of master switch 25 or by a changeover to normal filming by a reversal of switch 29.

With the circuit arrangement illustrated in FIG. 2 the mode of operation remains the same if the user holds the switch 56 depressed since the capacitors 18 and 24 cannot be discharged until gate 44 conducts to produce the restarting pulse I. It would be possible, however, to control that discharge in a manner independent of pulse I, e.g. by contacts on disk 88 closed during rotation of the shutter from its home position to the unblocking position. In such a case the continued closure of switch 56 would make the duration of the operating cycle substantially equal to the exposure interval, without intervention of pulse generator 20.

Naturally, AND gate 44 is also representative of various other logical coincidence (or anticoincidence) gates, such as those of the NAND, XOR or NOR type, which could be used with suitable changes in the logical circuitry including flip-flops 40 and 41. These flip-flops, furthermore, could be dispensed with if pulse generators 17 and 20 were replaced by threshold circuits emitting a continuous voltage as long as the associated capacitors 18 and 24 remain charged to or above the proper level.

Figure 4:
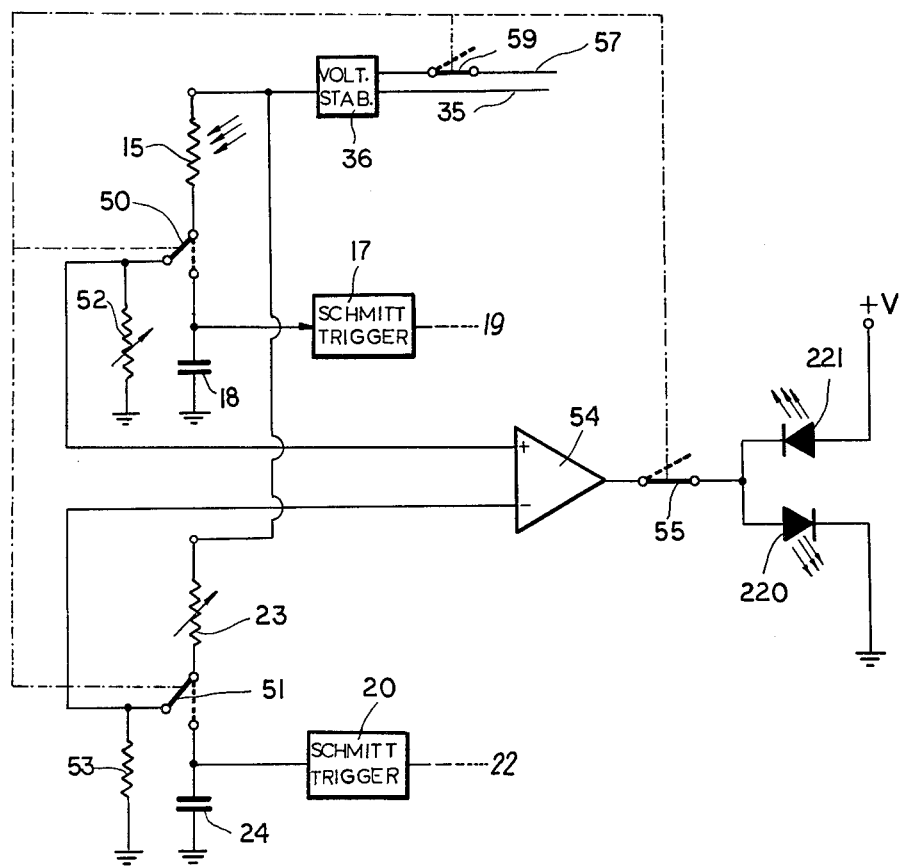
FIG. 4 shows additional components optionally included in the circuit of FIG. 2.

In FIG. 4 I have illustrated additional circuitry designed to apprise the user of a suitable setting of resistor 23 under given lighting conditions, provided of course that there is no significant change in illumination during the time required for picture taking. The voltage stabilizer 36 is here shown provided with another input connected via a switch 59 to the supply lead 57. Switch 59 is ganged with three other switches 50, 51 and 55 all shown in a test position in which capacitors 18 and 24 are cut off, with resistors 15 and 23 respectively connected by switches 50 and 51 to a pair of reference resistances 52 and 53 to form a bridge circuit. The supply voltage, developed between ground and the output of stabilizer 36, is applied across one bridge diagonal whereas the other diagonal is connected across the input of a differential amplifier 54 of the operational type. The output of amplifier 54 is connected via switch 55 to a junction of two LEDs 220 and 221 serially connected between high voltage +V and ground, these diodes being so designed that neither of them lights when the output voltage of the amplifier lies midway between +V and zero, i.e. when the bridge 15, 23, 52, 53 is in balance. This situation exists when the setting of resistor 23 is so related to the magnitude of photoresistor 15 that, with suitably selected values of resistances 52 and 53, the recurrence period $\tau_2$ equals or barely exceeds the exposure interval $\tau_1$. If photoresistor 15 has a higher resistance, i.e. if illumination is insufficient, the output voltage of amplifier 54 decreases so that LED 221 lights; this has the same significance as the lighting of LED 211 in FIG. 2 and, in fact, the same light-emitting diode can be used for both purposes. If, on the other hand, the resistance of photoresistor 15 is so low that the exposure interval $\tau_1$ is significantly shorter than the preset recurrence period $\tau_2$, the output voltage of amplifier 54 rises to make the LED 210 luminescent. Resistance 52 is shown to be adjustable to facilitate calibration of the bridge.

Figure 5:
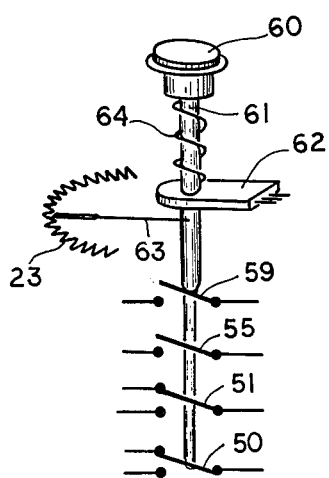
FIG. 5 is a perspective detail view of a switch assembly for the system of FIG. 4.

In order to simplify the task of the user in adjusting the resistor 23 to a value compatible with available illumination, I prefer to design the selector 60 (FIG. 1) as a pushbutton whose depression reverses the four ganged switches 50, 51, 55 and 59. Such a switch assembly has been illustrated in FIG. 5 where a stem 61 of pushbutton 60 traverses a fixed support 62 and carries a potentiometer arm 63 coacting with resistor 23, pushbutton 60 being held elevated by a spring 64 which opens the switches 55 and 59 while holding the switches 50 and 51 in a position completing the charging circuits for the associated capacitors 18 and 24. These four switches are reversed simultaneously by the stem 61 when the pushbutton 60 is depressed against the force of spring 64.

The positioning of a signaling device such as LED 211 in the light path of a viewfinder, as shown in FIG. 1, is useful only with relatively short operating cycles such as those utilized for trick cinematography or with only slightly reduced illumination preventing filming at normal speed. With long-term exposures of more extended duration, for which the camera is generally mounted on a tripod or other stable support, such an indicator should be located outside the camera so as to be readily observable by the user.

I claim:

1. In a motion-picture camera provided with an objective for the illumination of successive frames of a film, a shutter in line with said objective having an unblocking position enabling such illumination and a blocking position obstructing the light path from the objective to the film, and drive means coupled with said shutter for moving same into its blocking position during advances of the film from one frame to the next, the combination therewith of:

first timing means including a photosensitive element for measuring an exposure interval of a duration varying inversely with available luminous intensity;

second timing means including an adjustable impedance element for measuring a selected recurrence period; and a control circuit coacting with said drive means for placing said shutter in its unblocking position and activating said first and second timing means at the start of an operating cycle coinciding with the beginning of an exposure interval, a first branch of said control circuit being connected to the output of said first timing means and responsive to a signal therefrom for initiating a movement of said shutter from its unblocking position to its blocking position at the end of an exposure interval, a second branch of said control circuit being connected to the outputs of said first and second timing means for initiating a return from its blocking position to its unblocking position in response to a combination of signals from both said timing means to start another operating cycle.

2. The combination defined in claim 1 wherein said first timing means comprises a first one-shot pulse generator triggerable by a first time-constant network including said photosensitive element, said second timing means comprising a second one-shot pulse generator triggerable by a second time-constant network including said adjustable impedance element.

3. The combination defined in claim 1 wherein said second branch includes storage means also connected to the output of said first pulse generator for making the return of said shutter to its unblocking position dependent upon the arrival of a pulse also from said first pulse generator.

4. The combination defined in claim 2 wherein said second branch comprises a first flip-flop settable by a pulse from said first pulse generator, a second flip-flop settable by a pulse from said second pulse generator, a coincidence gate with inputs connected to respective outputs of said flip-flops, and delay means connected to said coincidence gate for resetting said flip-flops during an operating cycle initiated by the return of the shutter to its unblocking position.

5. The combination defined in claim 4 wherein said time-constant networks include respective capacitors provided with normally cut-off discharge paths connected to said coincidence gate for conduction substantially concurrently with the resetting of said flip-flops.

6. The combination defined in claim 4 wherein said second branch further includes logical circuitry connected to the outputs of said flip-flops for detecting the arrival of a pulse from said second pulse generator prior to that of a pulse from said first pulse generator, and indicator means controlled by said circuitry for signaling the lengthening of an operating cycle due to such sequence of pulse arrivals.

7. The combination defined in claim 6 wherein the objective includes a viewfinder, said indicator means being located in the light path of said viewfinder.

8. The combination defined in claim 2 wherein said photosensitive element is a photoresistor and said adjustable impedance element is a variable resistor, further comprising a pair of reference resistances, switch means for connecting said photoresistor and said variable resistor in a bridge circuit with said reference resistances, and signaling means connected across said bridge circuit to indicate the state of balance thereof under prevailing illumination, thereby enabling a readjustment of said variable resistor to make said recurrence period at least equal to said exposure interval.

9. The combination defined in claim 1 wherein said drive means comprises an electric motor and electromagnetic detent means in parallel therewith, said control circuit including a rotary carrier of conductor tracks coupled with said shutter for joint rotation by said motor, said detent means establishing said blocking and unblocking positions of the shutter, said conductor tracks coacting with respective contactors for maintaining said motor energized and said detent means ineffectual until the shutter approaches either of said positions.

10. In a motion-picture camera provided with an objective for the illumination of successive frames of a film, a shutter in line with said objective having an unblocking position enabling such illumination and a blocking position obstructing the light path from the objective to the film, and drive means coupled with said shutter for moving same into its blocking position during advances of the film from one frame to the next, the combination therewith of:

a first one-shot pulse generator triggerable by a first time-constant network including a capacitor chargeable through a photoresistor for measuring an exposure interval varying inversely with available luminous intensity;

a second one-shot pulse generator triggerable by a second time-constant network including a capacitor chargeable through a variable resistor for measuring a selected recurrence period;

a control circuit coacting with said drive means for placing said shutter in its unblocking position and initiating the charging of said capacitors at the start of an operating cycle coinciding with the beginning of an exposure interval, a first branch of said control circuit being connected to the output of said first pulse generator and responsive to a pulse therefrom for initiating a movement of said shutter from its unblocking position to its blocking position at the end of an exposure interval, a second branch of said control circuit being connected to the output of said second pulse generator and responsive to a pulse therefrom for initiating a return of said shutter from its blocking position to its unblocking position to start another operating cycle;

a pair of reference resistances;

switch means for connecting said photoresistor and said variable resistor in a bridge circuit with said reference resistances; and signaling means connected across said bridge circuit to indicate the state of balance thereof under prevailing illumination, thereby enabling a readjustment of said variable resistor to make said recurrence period at least equal to said exposure interval.

* * * * *